V. R. KOONTZ.
DIE HEAD.
APPLICATION FILED NOV. 15, 1919.
1,394,845.
Patented Oct. 25, 1921.
3 SHEETS—SHEET 1.
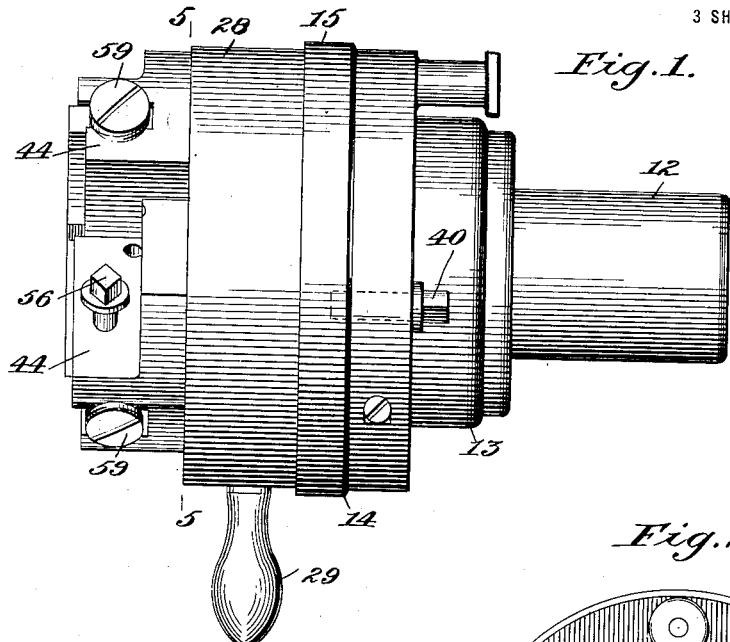
Fig.1.
Fig.2.
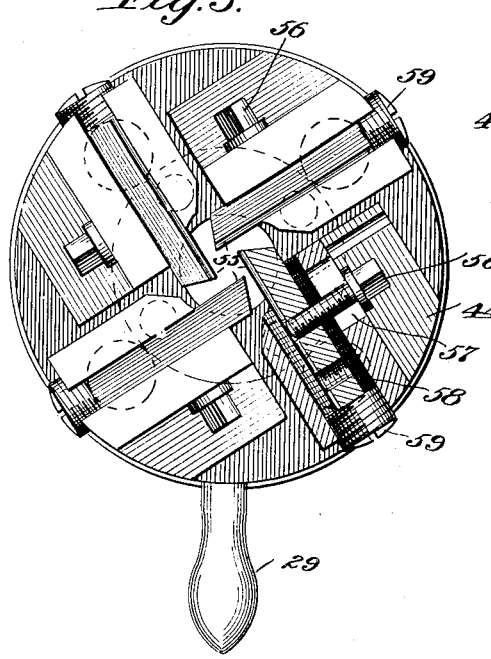
Fig.3.
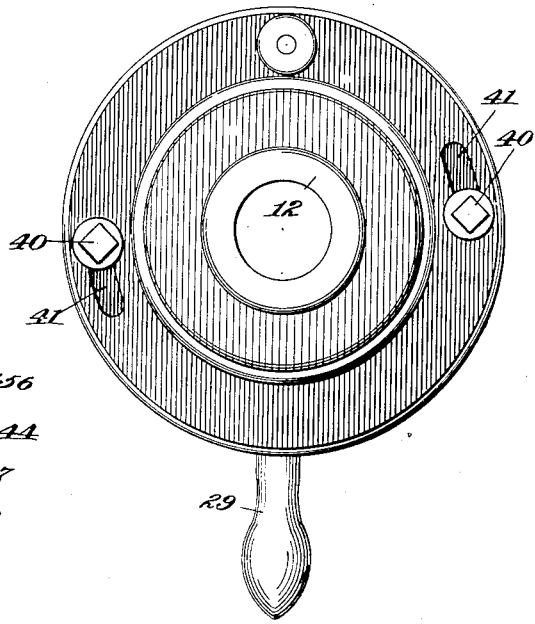
Inventor:
Victor R. Koontz,
by
Atty.

V. R. KOONTZ.
DIE HEAD.
APPLICATION FILED NOV. 15, 1919.
1,394,845.
Patented Oct. 25, 1921.
3 SHEETS—SHEET 2.
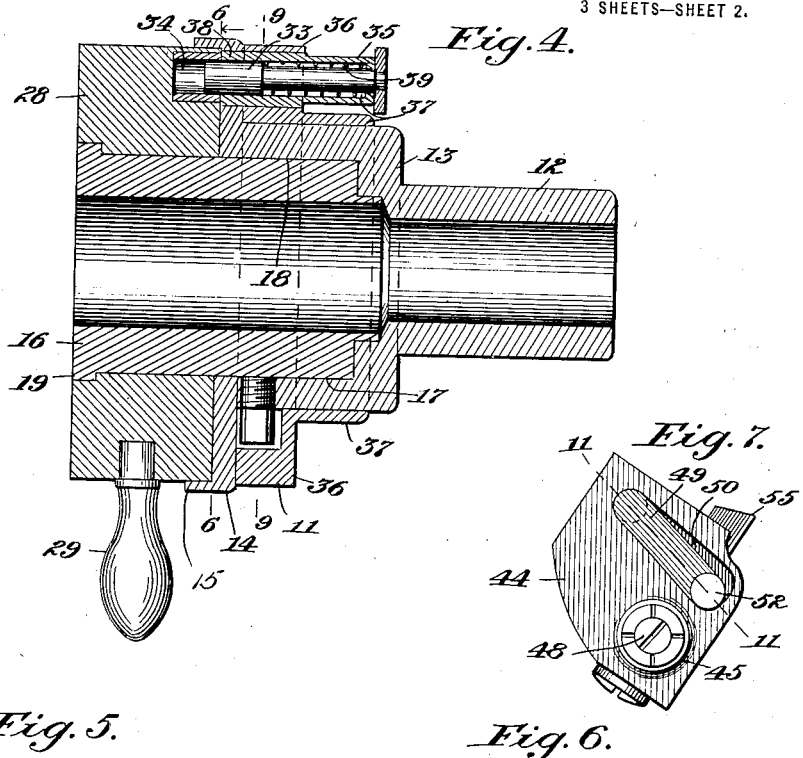
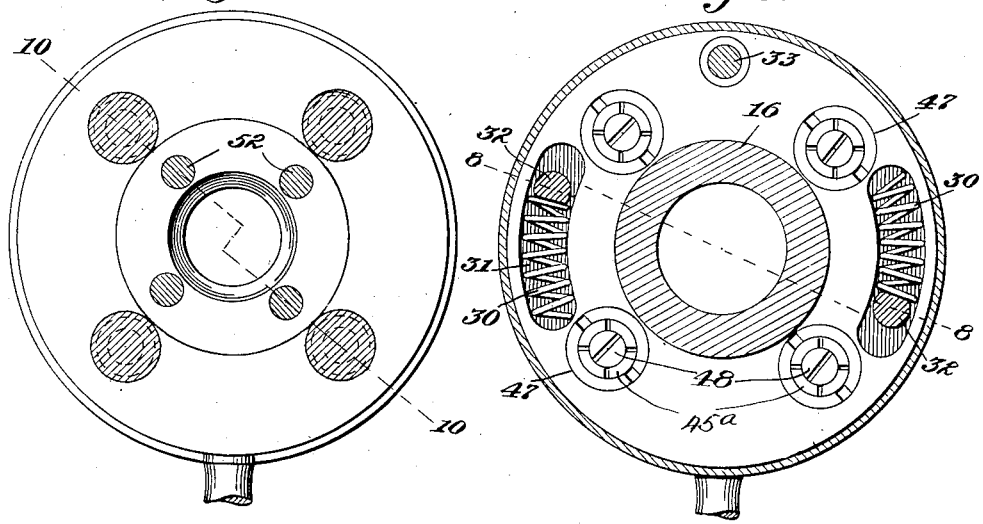
Inventor:
Victor R. Koontz,
by
Atty.

V. R. KOONTZ.
DIE HEAD.
APPLICATION FILED NOV. 15, 1919.
1,394,845.
Patented Oct. 25, 1921.
3 SHEETS—SHEET 3.
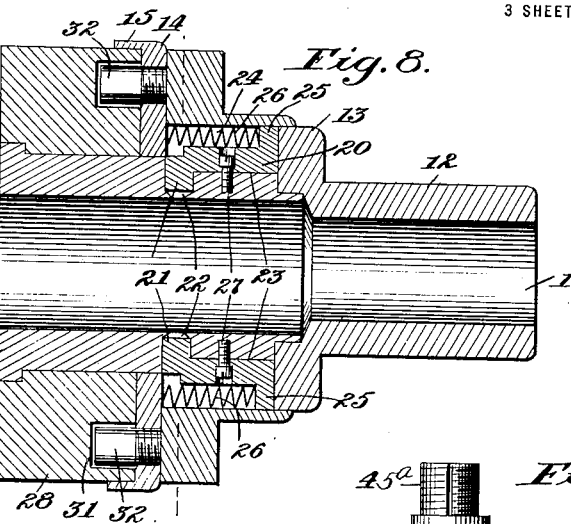
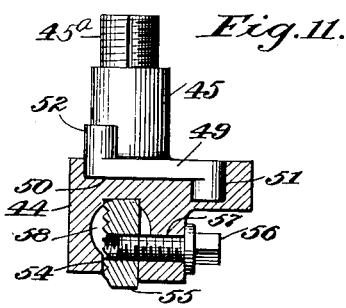
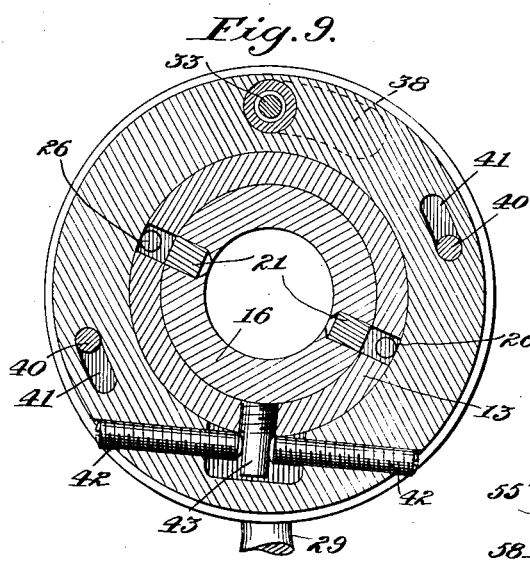
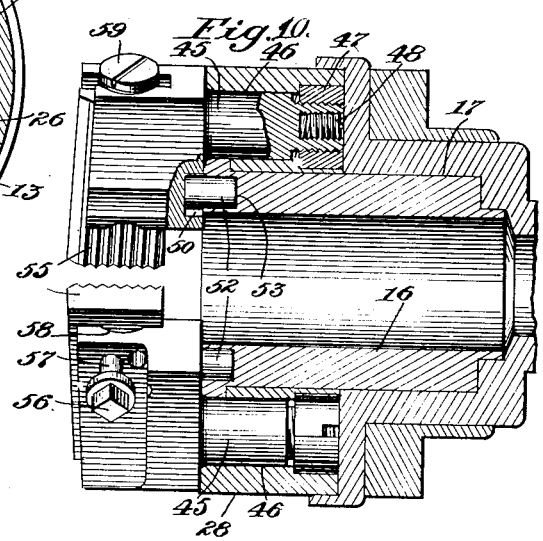
Inventor:
Victor R. Koontz,
by
Att'y.

UNITED STATES PATENT OFFICE.

VICTOR R. KOONTZ, OF WAYNESBORO, PENNSYLVANIA, ASSIGNOR TO THE VICTOR TOOL COMPANY, OF WAYNESBORO, PENNSYLVANIA, A CORPORATION OF PENNSYLVANIA.

DIE-HEAD.

1,394,845.  Specification of Letters Patent.  Patented Oct. 25, 1921.

Application filed November 15, 1919. Serial No. 338,260.

*To all whom it may concern:*

Be it known that I, VICTOR R. KOONTZ, a citizen of the United States, residing at Waynesboro, in the county of Franklin and State of Pennsylvania, have invented certain new and useful Improvements in Die-Heads, of which the following is a specification.

The present invention relates to die heads, and in a more specific sense to means for cutting external threads on metal articles.

One of the objects of the invention is to provide mechanism of a novel and practical character that will automatically be released from the work when a predetermined amount of thread has been cut thereon.

Another object is to have this mechanism simple and compact, but with the parts readily accessible and adjustable to thread articles of different diameters.

An embodiment of the invention is illustrated in the accompanying drawings, wherein:—

Figure 1 is a side elevation of the head,

Fig. 2 is a rear elevation thereof,

Fig. 3 is a front elevation with one of the cutter holders in section,

Fig. 4 is a longitudinal sectional view with the cutter holders removed,

Fig. 5 is a sectional view on the line 5—5 of Fig. 1,

Fig. 6 is a sectional view on the line 6—6 of Fig. 4,

Fig. 7 is a rear elevation of one of the cutter holders with the link in place thereon, Fig. 8 is a longitudinal sectional view on the line 8—8 of Fig. 6, Fig. 9 is a sectional view on the line 9—9 of Fig. 4, Fig. 10 is a sectional view on the line 10—10 of Fig. 5, Fig. 11 is an irregular section substantially on the line 11—11 of Fig. 7.

Similar reference numerals designate corresponding parts in all the figures of the drawings.

In the embodiment disclosed a stock member is employed, comprising a shank 12 having an enlarged front head 13 provided with an integral outstanding flange 14 having a forwardly extending rib 15. A supporting member in the form of a sleeve 16 has its rear end slidable in the enlarged portion 17 of the bore 18 of the stock, said supporting member or sleeve having an outstanding or retaining flange 19 on its outer or front end. This supporting sleeve is held against rotation with respect to the stock by keys 20. Each key, as shown more particularly in Fig. 8, consists of a body portion having an inwardly extending lug 21 that fits in a socket 22 formed in the sleeve 16. The body is seated partly in a recess 23 formed in the sleeve 16 and partly in a slot 24 formed in the head portion 13 of the stock. The said keys also have outstanding abutments 25 located in said slots, which abutments are borne against by coiled springs 26 located in the slots 24 and bearing against the opposite ends of said slots. The springs, as will be obvious, serve to yieldingly maintain the supporting member or sleeve 16 in its innermost position, but permit the outward movement of said sleeve, this outward movement being limited by the keys 20. Said keys are preferably held in place by suitable devices, as screws 27.

Rotatably mounted on the projecting portion of the supporting sleeve 16 is an actuating member 28 in the form of a ring that is interposed between the flange 19 and the flange 14, the rib 15 of said flange 14 overlying the ring, as shown. This ring is adapted to be rotated in one direction by an actuating handle 29, and is automatically moved in the opposite direction by coiled springs 30, shown more particularly in Fig. 6. These springs are located in slots 31 formed in the rear side of the actuating ring 28. Each spring bears at one end against the end of the slot and at its other end against a pin 32 carried by the flange 14 of the stock.

It will be obvious that the ring can be turned by the handle 29 to compress the springs 30, and when the handle is released, the springs have sufficient force to return the ring. It is, however, normally held against this turning movement by means of a locking bolt 33 adapted to enter a socket 34 formed in the rear side of the ring 28, as shown in Fig. 4. The bolt 33 is carried in a barrel 35 that is fixed in the outstanding flange 36 of a collar 37 rotatably mounted on the head 13 of the stock, the bolt and barrel passing through a slot 38 in the flange 14 of the stock. The bolt is spring-pressed, as illustrated at 39. The collar 37 is secured to the rear side of the flange 14 by bolts 40 passing through slots 41 in the flange 36. The collar 37 is also rotatably adjustable through the medium of oppositely disposed screws 42 threaded into said flange, as shown in Fig. 9 and bearing against opposite sides of a post 43 carried by the head 13 of the stock. By this means it will be evident that the position of the holding bolt 33 can be altered and definitely fixed.

Mounted on the outer faces of the supporting member 16 and actuating member 28 are cutter holders. Each of these cutter holders consists of a body 44 having an integral pintle 45 journaled in the socket 46 of the actuating member or ring 28. The inner terminals of the pintles 45 are longitudinally split and externally threaded, as shown at 46 to receive holding nuts 47 countersunk in the rear side of the actuating ring. The nuts are held against accidental rotation by the terminals 45ª being expanded, and to this end they are provided with threaded bores in which expanding plugs 48 are threaded. The pivotal movements of the cutter holders is effected by means of links, one being provided for each holder. Each link is designated 49, and is interposed between its cutter holder and the adjacent end faces of the members 16 and 28, being located in a recess 50 formed in the rear face of the cutter holder. Each link has an outstanding terminal pivot 51 journaled in the holder and an oppositely extending integral pivot 52 journaled in a socket 53 in the face of the supporting sleeve 16. It will thus be evident that upon the rotation of the ring 28, on the sleeve 16 the cutter holders will be caused to turn on their respective axes. Each of the cutter holders is provided in its outer face with a slot 54 constituting a guideway or seat for a cutter or "chaser" 55 that is normally held in adjusted position by a clamping bolt 56 threaded into the cutter and passing through a slot 57 in the holder body 44. The said bodies are also provided with bores 58 disposed longitudinally of the guideways 54 and having a diameter greater than the width of said guideways. These bores are threaded to receive adjusting abutment screw plugs 59.

The operation of the mechanism may be outlined as follows. When the actuating ring is turned against the springs 30 and locked by the bolt 33, the two members 16 and 28 are in their rearmost or inner position, as illustrated in Fig. 4. The cutters are then in their working positions, or in other words, swung to the inner limits of their movement, as shown in Fig. 3. If now the head is engaged with a rod or other work, as the therads are cut thereon, the relatively rotatable members 16 and 28 will be moved outwardly with respect to the stock 12, but will be held against relative rotation as long as the bolt 33 is engaged in the socket 34. It will be evident, however, that the continued sliding movement of these members on the stock will withdraw the actuating member 28 from engagement with the bolt, whereupon the member 28 will be rotated by the compressed springs 30. This will cause the cutter holders to swing outwardly due to the link connections 49 between said cutter holders and the inner or supporting member 16, thereby releasing the cutters or chasers from the work. The outward movement of the two members has also effected the compression of the springs 26 and when the cutters are disengaged from the work, said springs will react and return the two members 16 and 28 to their innermost position, pressing back the holding bolt 33, the socket 34 being now out of alinement with the bolt. To reset the device, or in other words, swing the cutters to their operative positions, it is only necessary for the operator to grasp the handle 29 and again turn the actuating ring 28 until the socket 34 is alined with the bolt 33, whereupon said bolt will be sprung into the socket, and at the same time the cutters will be swung inwardly, thus putting the head in condition to act upon a succeeding piece of work.

From the foregoing, it is thought that the construction, operation and many advantages of the herein described invention will be apparent to those skilled in the art, without further description, and it will be understood that various changes in the size, shape, proportion and minor details of construction, may be resorted to without departing from the spirit or sacrificing any of the advantages of the invention.

Having thus fully described my invention, what I claim as new, and desire to secure by Letters Patent, is:

1. In mechanism of the character described, the combination with a stock, of relatively rotatable members slidable longitudinally on the stock and having substantially flush front faces, a swinging cutter holder abutting against said faces, connections between the holder and members for effecting the swinging movement of the holder on the relative rotation of the members, and means for effecting their relative rotation upon their sliding movement on the stock.

2. In mechanism of the character described, the combination with a stock, of relatively rotatable members slidable longitudinally on the stock, a swinging cutter holder pivoted on one of the members, a direct pivoted connecting element between the holder and the other member for effecting the swinging movement of the holder on the relative rotation of the members, means for effecting their relative rotation upon their sliding movement on the stock in one direction from a predetermined position, and a lock for holding the members against relative rotation when in said predetermined position.

3. In mechanism of the character described, the combination with a stock, of a supporting member slidable thereon, an actuating member slidable therewith and rotatable thereon, a movably mounted lock for holding the actuating member against rotation, said members being slidable forwardly to release the lock and said lock being moved upon the rearward movement of the members, and a swinging cutter holder connected to and operated by the members on their relative rotation.

4. In mechanism of the character described, the combination with a stock, of a supporting member slidable thereon, a key for holding the supporting member against rotation with respect to the stock, an actuating member slidable therewith and rotatable thereon, a locking bolt slidably mounted on the stock and adapted to engage a recess in the actuating member for holding the actuating member against rotation, said members being slidable to release the lock, a swinging cutter holder connected to and operated by the members on their relative rotation, and a spring for effecting the rotation of the actuating member.

5. In mechanism of the character described, the combination with a stock having a bore, of a supporting member slidable in the bore and projecting beyond the stock, a key for holding the stock and member against relative rotation, an actuating member rotatably mounted on the projecting end of the supporting member, a locking bolt slidably mounted on the stock and detachably engaging the actuating member, a spring bearing against the actuating member to effect its rotation when dissengaged from the lock, spring means for returning the actuating and supporting members after the rotation of the former and operating to retract the bolt, and cutters pivoted on one member and having connections with the others to effect the swinging movement of said cutters on the rotation of the actuating member.

6. In mechanism of the character set forth, the combination with relatively rotatable members, of a cutter holder pivotally mounted on one member, and a swinging link connection between the cutter holder and the other member for effecting the swinging movement of the cutter holder on the relative rotation of the members.

7. In mechanism of the character set forth, the combination with relatively rotatable members, of a cutter holder pivotally mounted on one member, and a link pivoted to the other member and to the cutter holder for effecting the swinging movement of the cutter holder on the relative rotation of the members.

8. In mechanism of the character set forth, the combination with a supporting member, of an actuating member rotatably mounted thereon, a cutter holder pivoted on the actuating member, and a link pivoted to the cutter holder and to the supporting member to effect the swinging movement of the holder on the rotary movement of the actuating member.

9. In mechanism of the character set forth, the combination with a supporting member, of an actuating ring surrounding the same, a cutter holder extending over the faces of the supporting member and actuating ring and having a pivot mounting on the ring, and a link interposed between the holder and the member and ring and having a pivotal mounting on the holder at one side of its pivot axis, said link also having a pivot mounting on the supporting member.

10. In mechanism of the character set forth, the combination with a stock having a bore, of a supporting member slidable in the bore and projecting beyond the stock, a key for holding the stock and member against relative rotation, an actuating member rotatably mounted on the projecting end of the supporting member, a lock carried by the stock and detachably engaging the actuating member, a spring bearing against the actuating member to effect its rotation when disengaged from the lock, cutter holders pivoted on the actuating member, and links pivoted to the cutter holders and to the supporting member for effecting the swinging of the cutter holders on the rotation of the actuating member.

11. In mechanism of the character set forth, the combination with relatively rotatable members, of a cutter holder having a pintle rotatably mounted in one of the members, said pintle having a split externally threaded terminal provided with a threaded bore, a holding nut on the threaded terminal, a locking plug threaded into the bore, and means engaged with the other member and with the holder to effect the pivotal movement of the latter.

In testimony whereof, I affix my signature in the presence of two witnesses.

VICTOR R. KOONTZ.

Witnesses:
Roy G. Mumma,
Daniel S. Beard.